United States Patent [19]
Sakai

[11] Patent Number: 5,619,087
[45] Date of Patent: Apr. 8, 1997

[54] AXIAL-GAP ROTARY-ELECTRIC MACHINE

[75] Inventor: Kazuto Sakai, Yokosuka, Japan

[73] Assignee: Kabushiki Kaisha Toshiba, Kawasaki, Japan

[21] Appl. No.: 140,130

[22] PCT Filed: Mar. 16, 1993

[86] PCT No.: PCT/JP93/00312

§ 371 Date: Nov. 8, 1993

§ 102(e) Date: Nov. 8, 1993

[30] Foreign Application Priority Data

Mar. 18, 1992 [JP] Japan ................................... 4-061886
Jul. 10, 1992 [JP] Japan ................................... 4-183328

[51] Int. Cl.$^6$ .................................................. H02K 1/27
[52] U.S. Cl. ....................... 310/268; 310/43; 310/89; 310/156; 310/261; 310/262
[58] Field of Search ................................... 310/156, 268, 310/114, 89, 51, 43, 262

[56] References Cited

U.S. PATENT DOCUMENTS

| | | | |
|---|---|---|---|
| 3,482,131 | 12/1969 | Lytle | 310/156 |
| 3,784,850 | 1/1974 | Inaba | 310/268 |
| 4,211,945 | 7/1980 | Tawse | 310/156 |
| 4,551,645 | 11/1985 | Takahashi et al. | 310/156 |
| 4,578,610 | 3/1986 | Kliman et al. | 310/268 |
| 4,794,293 | 12/1988 | Fujisaki | 310/268 |
| 4,968,911 | 11/1990 | Denk | 310/42 |
| 4,980,590 | 12/1990 | Taniguchi | 310/268 |
| 4,996,457 | 2/1991 | Hawsey et al. | 310/156 |
| 5,117,141 | 5/1992 | Hawsey et al. | 310/156 |
| 5,128,575 | 7/1992 | Heidelberg | 310/156 |
| 5,184,040 | 2/1993 | Lim | 310/156 |
| 5,245,238 | 9/1993 | Lynch | 310/268 |
| 5,396,140 | 3/1995 | Goldie | 310/268 |

FOREIGN PATENT DOCUMENTS 47-29806 11/1972 Japan.
57-108671 7/1982 Japan.
60-216757 10/1985 Japan.
1-308159 12/1989 Japan.

OTHER PUBLICATIONS

K. Sakai et al., "Structure & Characteristics of New High Speed Machines With Two or Three Rotor Discs"; Oct. 2–8, 1993; Toronto, Canada.
IEEE Southeast Conference, 1988, J.M. Bailey et al: "A Self–Starting, Axial–Gap Permanent Magnet Motor and Adjustable–Speed Drive", pp. 518–522.
Conference Record of IEEE —IAS Annual Meeting, 24th(vol. 1), 1989, J.S. Lai et al: "Optimum Current Control For A High Speed Axial–Gap Premanent Magnet Synchronous Motor", pp. 767–772.
Alsthom Review, No. 9, 1987, C. Haglon: "Improving Power–To–Weight and Power–To–Size Ratios For Variable–Speed Drives", pp. 53–60.

Primary Examiner—Steven L. Stephan
Assistant Examiner—Karl Imayoshi Tamai
Attorney, Agent, or Firm—Oblon, Spivak, McClelland, Maier & Neustadt, P.C.

[57] ABSTRACT

An axial-gap rotary-electric machine which can rotate at a very high speed and can generate a large output and in which a gap is formed extending in the axial direction of the shaft. The rotary-electric machine comprises a rotor (12) and a stator (11). The rotor comprises a plurality of discs members (24-1, 24-2) made of fiber-reinforced plastic or nonmagnetic metal, and a plurality of groups (25) of permanent magnets embedded in said disc members (24-1, 24-2), forming a plurality of magnetic poles on said disc members (24-1, 24-2). Each of the groups (25) consists of a plurality of permanent magnets (25a). The stator (11) includes a casing (11A) and a first stator winding (16B). The casing (11A) comprises a frame (13), brackets (14-1, 14-2), back yokes (15-1, 15-2), and at least one second stator winding (16A-1, 16A-2) divided into a plurality of units in a radial direction.

20 Claims, 15 Drawing Sheets

15-1 (15-2)

AXIAL-GAP ROTARY-ELECTRIC MACHINE

TECHNICAL FIELD

The present invention relates to an axial-gap rotary-electric machine, and more particularly to an axial-gap rotary-electric machine having permanent magnets.

BACKGROUND ART

There are two types of rotary-electric machines. The first type is a radial-gap rotary-electric machine in which the gap between the rotor and the stator extends in the radial direction of the shaft. The second type is an axial-gap rotary-electric machine in which the gap between the rotor and the stator extends in the axial direction of the shaft.

A radial-gap rotary-electric machine of a very high speed of 10000 rmp or more generates a considerably large centrifugal force while its shaft is rotating. In a high-speed radial-gap rotary-electric machine having permanent magnets incorporated in the field system of the rotor, a nonmagnetic holding ring having a considerably large thickness is wound around the outer periphery of the permanent magnets so that the magnets may not disintegrate and moved from the rotor. In a high-speed radial-gap rotary-electric machine having a coil used in the field system of the rotor, a holding ring holds the end ring of the coil.

An axial-gap rotary-electric machine comprises a rotor disc, an armature coil and a stator disc which are arranged along the axis of the shaft, opposing one another with gaps among them. A coil or permanent magnets are mounted on the rotor disk, forming poles of a magnetic field.

When the conventional radial-gap rotary-electric machine rotates at a very high speed of 10000 rmp or more, its centrifugal force becomes considerably great, and the rotor coil may fail to withstand the force and may thus be broken.

In a radial-gap rotary-electric machine which has, as shown in FIG. 1, permanent magnets 101 in the field system, a nonmagnetic holding ring 102 is required which is thick enough to prevent the magnets 101 from being moved from the rotor. Being made of nonmagnetic material so that a magnetic circuit may not be short-circuited, the holding ring 102 inevitably has a long magnetic gap. The electromotive force is consumed in the gap in a large amount, reducing the output of the rotary-electric machine. In FIG. 1, numerals 103, 104, 105, 106, 107, 108, and 109 designate the stator frame, the stator core, the coil, the rotor, the rotor yoke, the shaft, and the gap, respectively.

In an axial-gap rotary-electric machine schematically shown in FIG. 2, the disc-shaped rotor yoke 110 is made of magnetic metal such as soft iron. An axial-gap rotary-electric machine of this type therefore has a larger rotor inertia than an ordinary axial-gap rotary-electric machine. It takes this machine a long time to reach a target speed after it has been energized started, and to stop after it has been de-energized. Axial-gap rotary-electric machines of this type are, therefore, considered unsuitable for use in robots or automatic machines which need to accelerated and decelerated quickly. In FIG. 2, numerals 111, 112, 113, 114, 115, and 116 denote the motor frame, the stator yoke, the coil, the bearing, the shaft, and the permanent magnets, respectively. The coil 113 has an U phase 113a, a V phase 113b, and a W phase 113c.

In the conventional axial-gap rotary-electric machine, the rotor cannot have a plurality of discs so that the machine may have a large capacity and rotate at high speed. This is because stator discs each having an armature coil and rotor discs need to be alternately arranged in the axial direction of the shaft. Since the capacity is increased by using only one rotor disc, the rotor must be one having a large diameter, making it difficult for the machine to rotate at high speed or to generate a large output.

In the axial-gap rotary-electric machine of this type, the yoke 110 of the rotor defining a magnetic flux passage is made of magnetic material such as soft iron. The rotor of the axial-gap rotary-electric machine is inevitably heavy and may have a problem in terms of mechanical strength against a centrifugal force. Furthermore, the load on the bearing increases in the axial-gap rotary-electric machine of this type, the critical speed, i.e., the maximum allowable speed, for the shaft decreases. The shaft cannot rotate at high speed.

An object of the present invention is to provide an axial-gap rotary-electric machine which can rotate at high speed.

Another object of the invention is to provide an axial-gap rotary-electric machine which can generate a large output.

Still another object of this invention is to provide an axial-gap rotary-electric machine which can rotate at high speed and generate a large output.

DISCLOSURE OF INVENTION

The first object of the invention can be attained by an axial-gap rotary-electric machine in which the gap between the stator member and the rotor member having a shaft extends in the axial direction of the shaft, and the rotor member comprises a disc member made of non-magnetic material, formed integral with the shaft and rotatable together with the shaft, and a plurality of groups of permanent magnet members, each group located inside the disc member to form a plurality of magnetic poles on the disc member.

In this axial-gap rotary-electric machine according to the invention, the groups of permanent magnets located inside the disc member form the magnetic poles of the rotor, without using a yoke. This helps to reduce vibration and enhance mechanical strength against a centrifugal force. As a result, the machine can rotate at high speed.

The above-described other object of the invention is achieved by an axial-gap rotary-electric machine in which the gap between the stator member and the rotor member having a shaft extends in the axial direction of the shaft, and the stator member comprises a casing member and at least one stator winding divided into a plurality of units in the radial direction of the shaft.

In this axial-gap rotary-electric machine according to the invention, the stator winding is divided into a plurality of units in the radial direction of the shaft. The stator winding can therefore be made in tandem structure, whereby the rotor need not have a large diameter. As a result, the machine can have a large capacity.

The above-described still other object of the invention is achieved by an axial-gap rotary-electric machine in which the gap between the stator member and the rotor member having a shaft extends in the axial direction of the shaft, and which comprises:

a rotor member comprising a disc member made of nonmagnetic material and rotatable together with the shaft, and a plurality of groups of permanent magnets, each group located inside the disc member to form a plurality of magnetic poles on the disc member; and a stator member comprising a casing member and at least one stator winding divided into a plurality of units in the radial direction of the shaft.

In this axial-gap rotary-electric machine according to the present invention, the groups of permanent magnets located inside the disc member form the magnetic poles of the rotor, without using a yoke. This helps to reduce vibration, enhance mechanical strength against a centrifugal force and raise the rotational speed. In addition, since the stator winding is divided into a plurality of units in the radial direction of the shaft, it can be made in tandem structure, whereby the rotor need not have a large diameter. As a result, the machine can have a large capacity.

BEST MODE OF CARRYING OUT THE INVENTION

Figure 3:
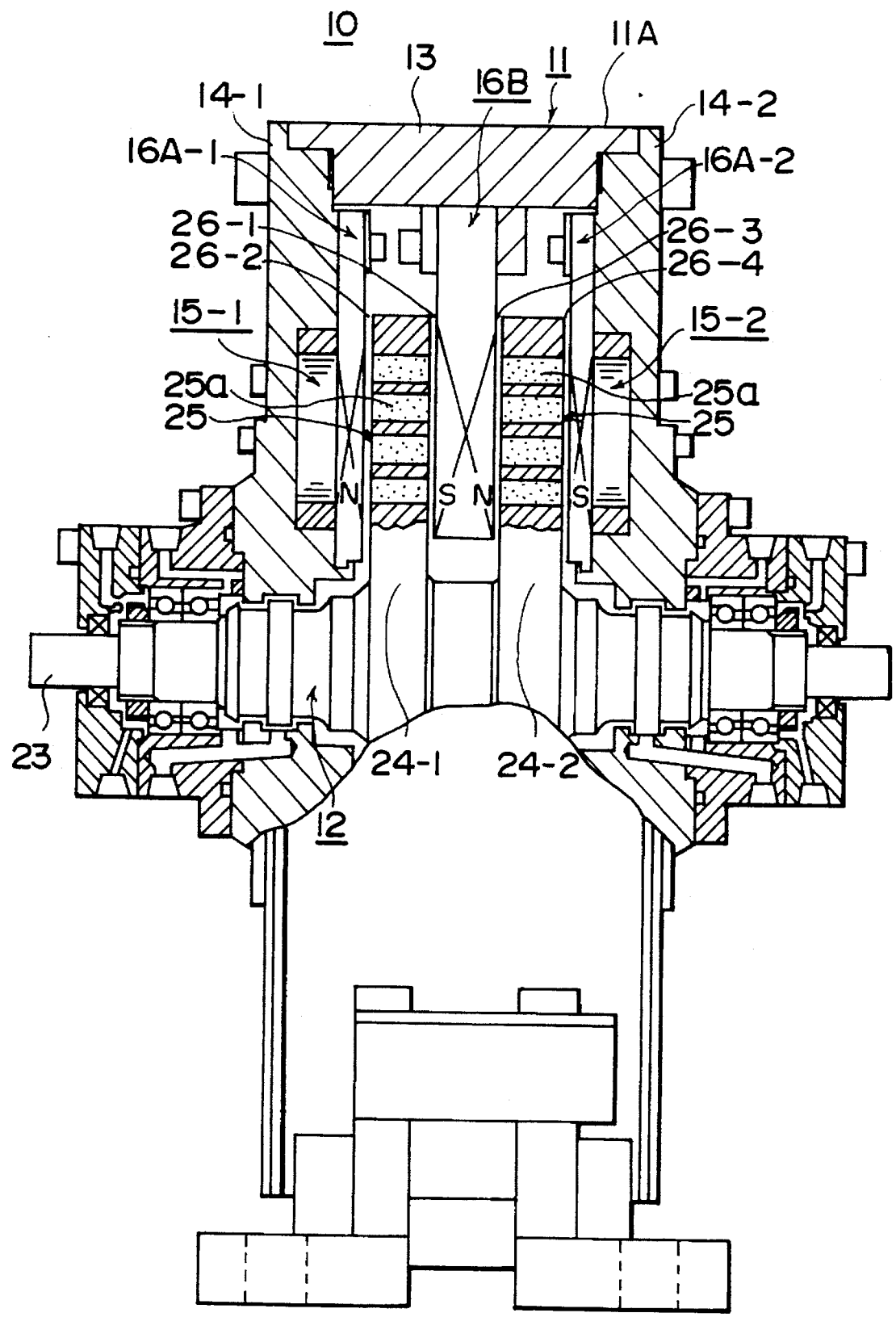
FIG. 3 is a vertical sectional view showing the major parts of an embodiment of the present invention.

FIG. 3 is a vertical sectional view showing the major parts of an embodiment of the present invention. As shown in FIG. 3, the axial-gap rotary-electric machine 10 comprises a stator 11 and a rotor 12 supported in the stator 11 by means of a bearing.

Figure 5:
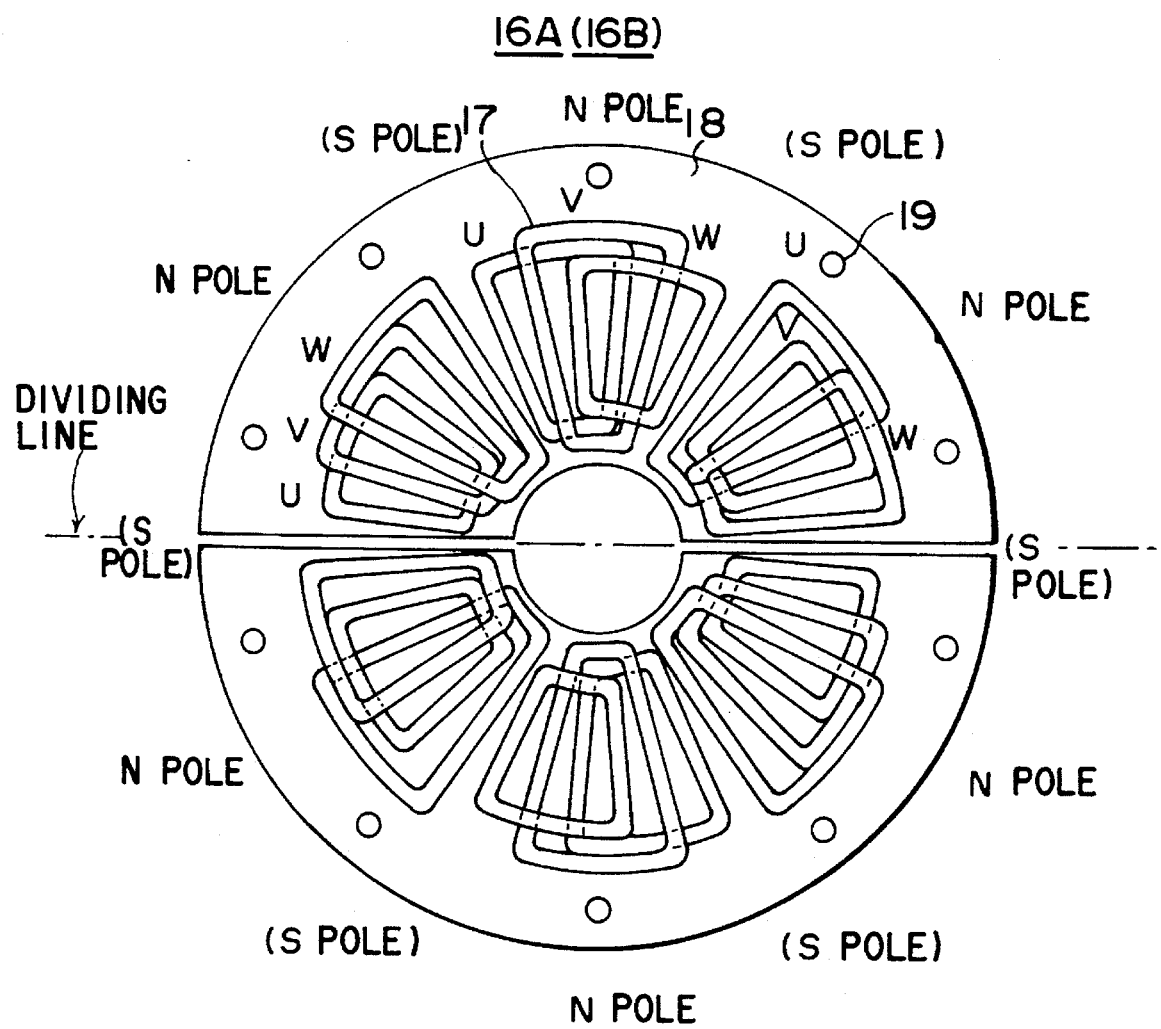
FIG. 5 is a diagram illustrating the molded windings used in the embodiment of this invention.

The stator 11 includes a casing 11A and a molded winding 16B. The casing 11A is comprised of a frame 13, brackets 14-1 and 14-2, back yokes 15-2, and molded windings 16A-1 and 16A-2. The stator 11 formed of these components can be divided into an upper half and a lower half at a plane containing the axis of the rotor 12, as is schematically illustrated in FIG. 5.

The frame 13 is substantially a hollow cylinder. The brackets 14-1 and 14-2 are attached to the opening ends of the frame 13, respectively. The back yokes 15-1 and 15-2 have no slots, are placed in the recesses made in the brackets 14-1 and 14-2, respectively, and fixed thereto by fastening means. The molded windings 16A-1 and 16A-2 are mounted on the back yokes 15-1 and 15-2 and connected to the brackets 14, thus constituting a stator winding. The molded winding 16B is attached to the center part of the frame 13 and serves as the stator winding.

The molded windings 16A-1, 16B-2, and 16B form a disc-shaped unit. As shown in FIG. 5, this unit is divided into an upper half and a lower half, each being semicircular. Three windings 17, each having phases U, V and W, are mounted on either half of the disc-shaped unit. These windings 17 are bound together with a molding-resin layer 18 made of epoxy resin or the like. The windings 17 have been formed either by one-direction winding method or by concentric winding method. As shown in FIG. 5, the windings 17 form real poles (N poles) and imaginary poles (S poles) such that the centers of the virtual poles are lies in the line dividing the casing 11 into halves.

The molding-resin layer 18 has through holes 19 in the peripheral edge. These holes allows the passage of bolts for fastening the layer 18 to the brackets 14-1 and 14-2 and the frame 13. Terminals (not shown) are arranged on the molding-resin layer 18, at the sides of the windings 17, each having phases U, V and W. To these terminals, cables extending from an external power supply through the frame 13 are connected. Lead wires may be pulled from the ends of each winding 17 through a hole made in the frame 13 and may be connected to a cable outside the frame 13.

Figure 6:
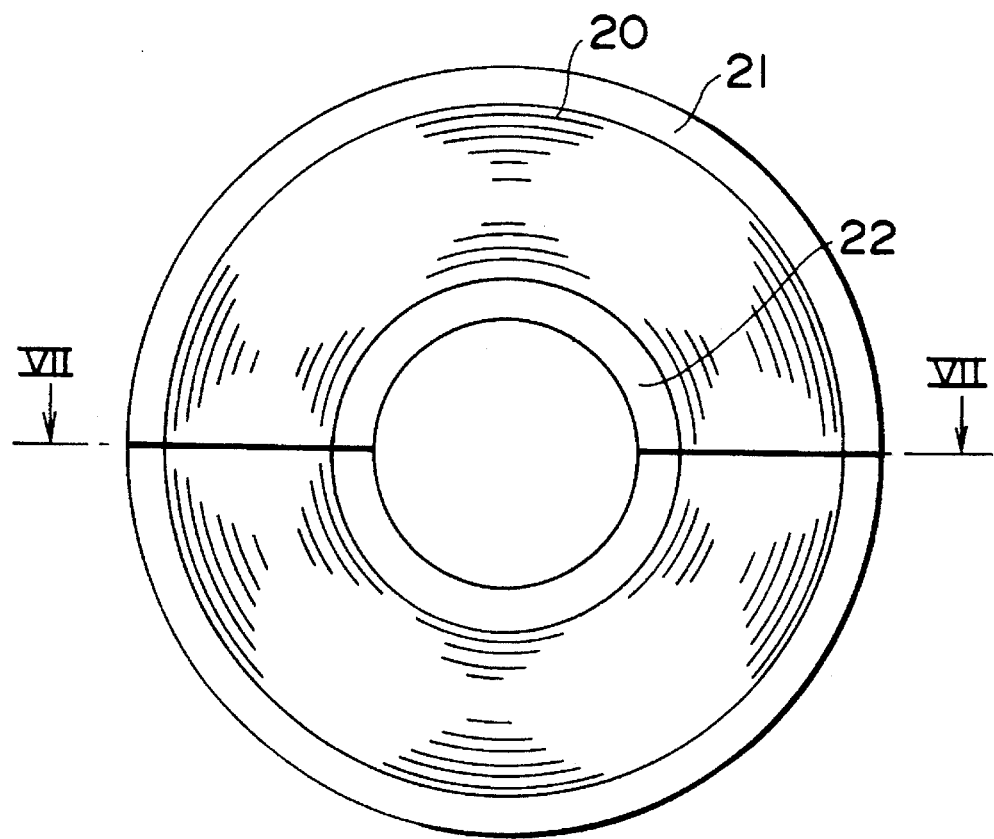
FIG. 6 is a diagram showing one of the back yokes used in the embodiment of the invention.
Figure 7:
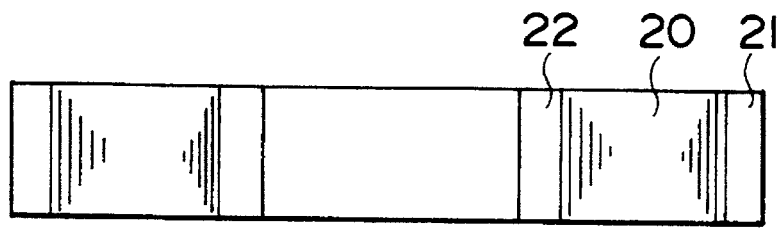
FIG. 7 is a plan view taken along line VII—VII in FIG. 6.

Each of the back yokes 15-1 and 15-2 has been formed in the following way. First, as shown in FIGS. 6 and 7, a strip 20 of silicon steel having a thickness of 0.2 mm is wound into a coil. Then, the coil is interposed and fixed between an outer ring 21 and an inner ring 22. Finally, the resultant structure is cut into two semicircular units. These units of one back yoke are fastened to the bracket 14-1, and the units of the other back yoke are fastened to the bracket 14-2.

The rotor 12 comprises a shaft 23, two rotor discs 24-1 and 24-2, and twelve groups 25 of permanent magnets.

Figure 8:
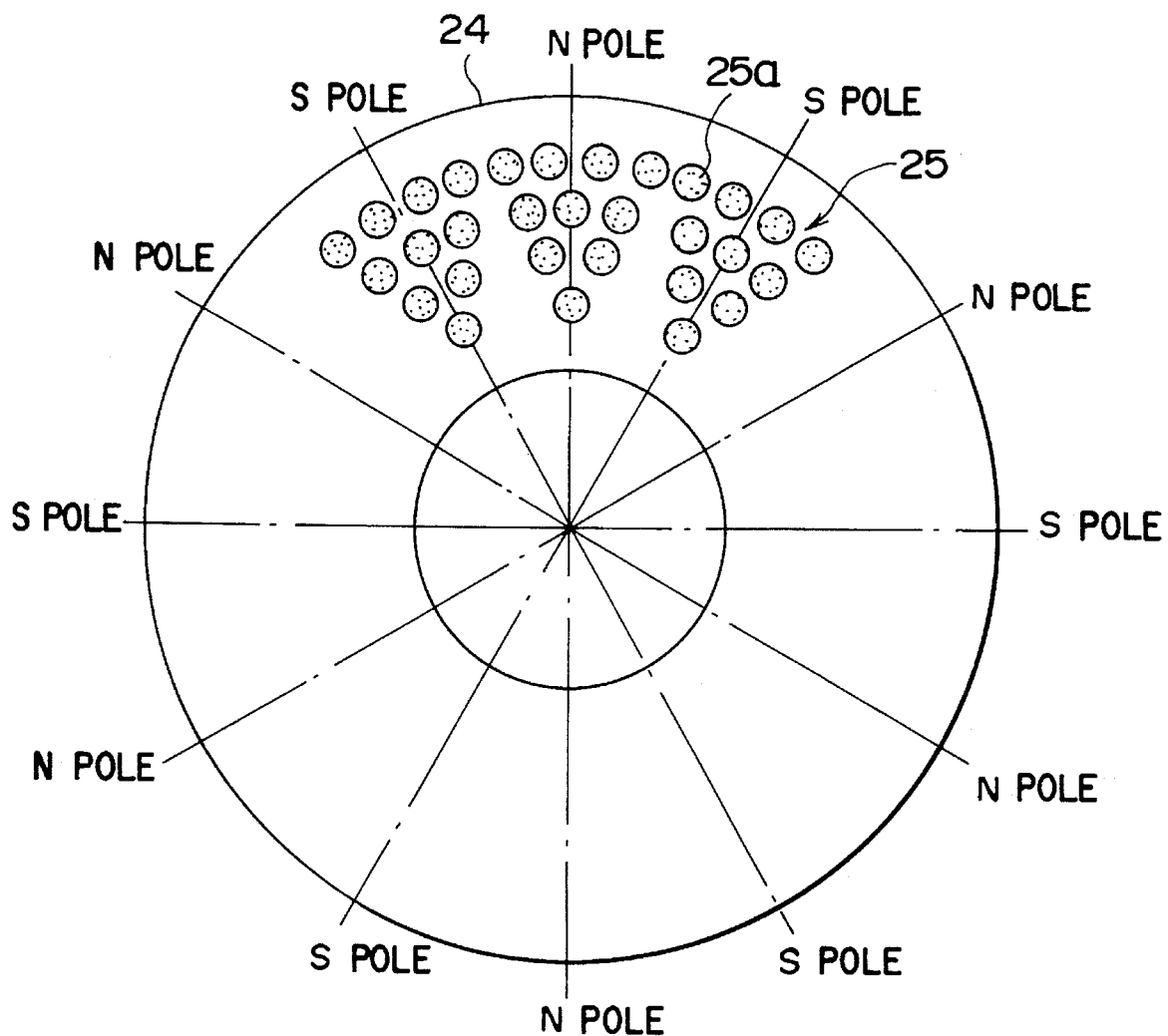
FIG. 8 is a plan view of the rotor disc used in the embodiment of the invention, illustrating how permanent magnets are embedded in the surface of the rotor disc.

The shaft 23 is made of magnetic material such as a magnetic metal. The two rotor discs 24-1 and 24-2 are also made of magnetic material such as a magnetic metal. The two rotor discs 24-1 and 24-2 and the shaft 23 are formed integral. The discs 24-1 and 24-2 and the shaft 23 may be formed by cutting a magnetic material. The groups 25 of permanent magnets are attached to each of the rotor discs 24-1 and 24-2 at twelve places, ten permanent magnets at each place, as is illustrated in FIG. 8. Each of the permanent magnets 25a is shaped like a solid cylinder, magnetized in its axial direction, and is inserted and fixed in a hole made in the surface of the rotor disc 24-1 or 24-2 and extending parallel to the axis thereof. Each group 25 of permanent magnets forms one magnetic pole. Hence, twelve magnetic poles are formed on each of the rotor discs 24-1 and 24-2, spaced apart at predetermined intervals along the circumference of the rotor disc.

The rotor discs 24-1 and 24-2 are arranged among the molded windings 16A and 16B, spaced apart from the windings in the axial direction, by gaps 26-1, 26-2, 26-3, and 26-4. The magnetic poles defined by the rotor discs 24-1 and 24-2 each comprise ten permanent magnets 25a (i.e., a permanent magnet group 25) which are distributed as shown in FIG. 8 and forms one pole. In this embodiment, twelve magnetic poles are formed. Only three groups 25 of permanent magnets are shown in FIG. 8.

Thus, in this embodiment, 120 permanent magnets 25a are embedded in each of the rotor discs 24-1 and 24-2. Since this embodiment has two rotor discs, the rotor magnetic poles are formed by 240 permanent magnets 25a.

Figure 1:
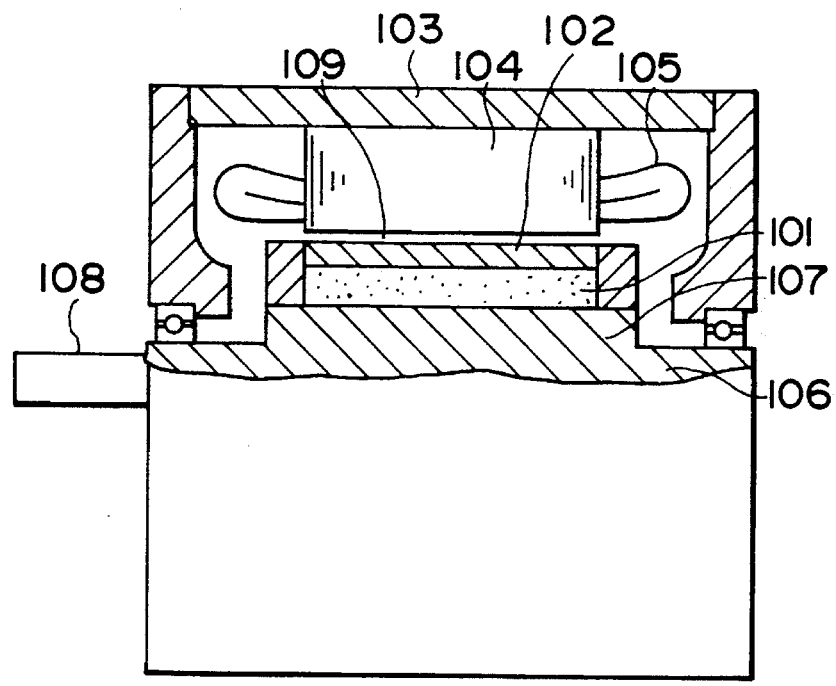
FIG. 1 is a sectional view showing the upper half of a radial-gap rotary-electric machine.

The operation of the embodiment described above will now be described. First, its mechanical function will be explained. The groups 25 of permanent magnets (i.e., the permanent magnets 25a), which constitute the field system, are embedded in the surfaces of the rotor discs 24-1 and 24-2 and extend parallel to the axis of the machine 10. The rotor discs 24-1 and 24-2 therefore prevent the groups 25 of permanent magnets (i.e., the permanent magnets 25a) from moving under the centrifugal force generated when the machine 10 rotates at high speed. The rotor discs 24-1 and 24-2 must be thick enough to have a sufficient strength against the centrifugal force. In the conventional radial-gap rotary-electric machine shown in FIG. 1 and described above, the gap 109 will be long if the ring 102 holding the rotor is made thick.

In the rotary-electric machine according to the present embodiment, the magnetic gap of the magnetic circuit does not increase even if the peripheral portions of the rotor discs 24-1 and 24-2 are made thick. This is because the magnetic field generated by the groups 25 of permanent magnets (i.e., the permanent magnets 25a) does not extend along the axis of the shaft. As a result, the machine can rotate at high speed, without a reduction in output, despite an increase in the mechanical strength against the centrifugal force.

As for the groups 25 of permanent magnets (i.e., the permanent magnets 25a), the groups 25 form the poles of a magnetic field, and not just one permanent magnet is used for forming one pole. Rather, the permanent magnets 25a of constituting one group 25 are distributed to form one pole. The permanent magnets 25a of each group 25 are embedded in ten holes made in the surface of each of the rotor discs 24-1 and 24-2, whereby the stress resulting from the centrifugal force does not concentrate at a part of either rotor disc. The rotor discs 24-1 and 24-2 can remain integral while rotating at a very high speed.

The rotary-electric machine of this embodiment is of axial-gap type. The rotor 12 is shaped like a flywheel. Hence, the distance between the bearings supporting the rotor discs 24-1 and 24-2, respectively, can be much shorter than otherwise. The rigidity of the rotating shaft system is thereby increased. As a result, the shaft system has a high natural frequency. The shaft vibrates but a little and is stable even while rotating at a very high speed.

Figure 14:
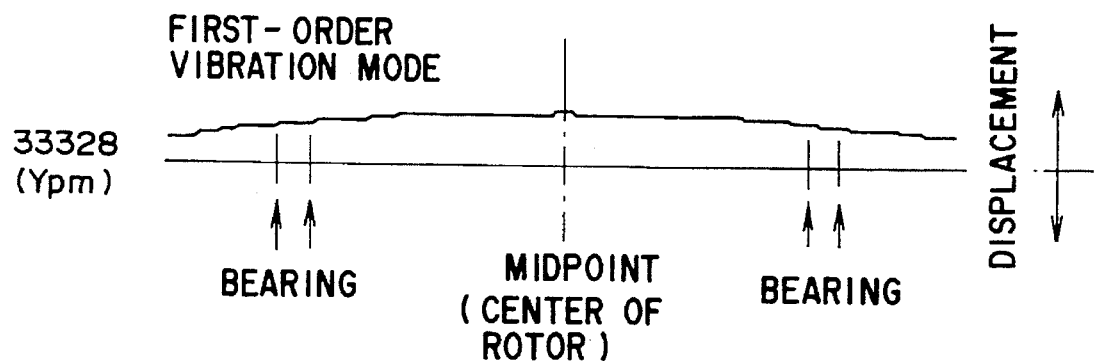
FIG. 14 is a diagram for explaining the operation of the embodiment of the present invention.

FIG. 14 is a diagram for explaining the operation of the embodiment of the present invention.

Figure 15:
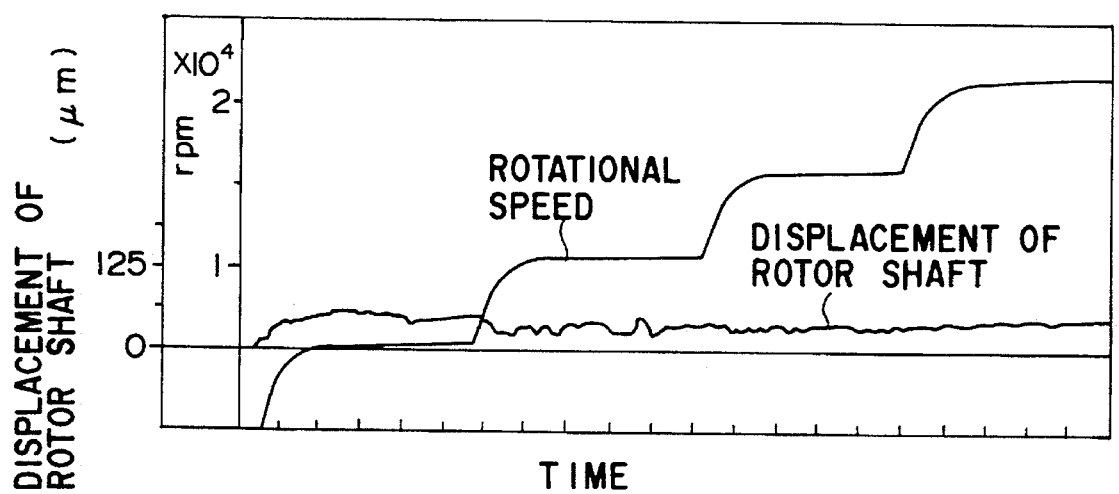
FIG. 15 is another diagram for explaining the operation of the embodiment of this invention.

FIG. 15 is another diagram for explaining the operation of the embodiment of this invention. The electromagnetic function of the present embodiment will now be described. The stator winding section consists of the windings 17 and the molding-resin layer 18 only; it has no rotor core. Thus, the magnetic circuit is formed of only the back yokes 15 located inside the brackets 14-1 and 14-2, the groups 25 of permanent magnets (i.e., the permanent magnets 25a), and gaps 26-1, 26-2, 26-3 and 26-4. The magnetic components forming a magnetic path are the two back yokes 15 only. Hence, it suffices to arrange the molded windings 16A-1, 16A-2 and 16B and the rotor discs 24 alternately between the two back yokes 15, thereby constituting a multi-stage operating section in the rotary-electric machine. The output of the machine can therefore increase.

Since the stator core has no teeth, the magnetic circuit consists of only the back yokes 15-1, 15-2, the groups 25 of permanent magnets (i.e., the permanent magnets 25a), and the gaps 26-1, 26-2, 26-3 and 26-4. Hence, only the magnetic components forming the magnetic path, i.e., the two back yokes 15, can form the multi-stage operating section of the rotary-electric machine. The iron loss therefore decreases greatly, enhancing the efficiency of the rotary-electric machine and reducing the temperature increase occurring during the operation of the machine.

Since the inner circumference of the machine is short as in any axial-gap rotary-electric machine, the space available for the ends of the windings 17 is limited. This renders it impossible for each winding to have many turns. Nonetheless, the machine of the present embodiment can have many poles and rotate at a very high speed since, as described above, the iron loss is reduced. Furthermore, since the axial-gap rotary-electric machine of this embodiment is of multi-pole type, the ends of the windings 17 can be made shorter so that each may have more turns to increase the output of the machine.

The back yokes 15-1, 15-2 are coils, each formed of the strip 20 of silicon steel having a thickness of 0.2 mm and clamped and fixed between the outer ring 21 and the inner ring 22. With the back yokes 15-1, 15-2 so constructed, the generation of a eddy current is controlled. This helps to reduce an increase in the iron loss of the rotary-electric machine.

Generally, when a rotary-electric machine having a toothed stator core rotates at high speed, the teeth of the stator core cause pulsation of the magnetic fluxes in the gap. Consequently, a considerably large eddy current is generated at the rotor surface. No eddy current is generated in the rotary-electric machine of this embodiment since the core has no teeth. The machine therefore has high efficiency.

The soft magnetic material forming a magnetic path for the windings 17 is only that of the back yokes 15-1, 15-2. The magnetic gaps to the windings 17 are considerably wide. Hence, the inductance of each winding 17 is low, and the voltage drop due to the inductance is small. The voltage across the terminals of each winding 17 is low. The power supply for driving the windings 17 can be a small one.

Since the magnetic gaps are wide, the armature reaction due to the windings 17 is small. Hence, the permanent magnets 25 (i.e., the permanent magnets 25a) mounted on the rotor 12 are prevented from being demagnetized, making it possible to flow a large current.

How the stator 11 is divided will now be explained. The rotary-electric machine according to the present invention has a multi-stage operating section so that it may produce a great output. More specifically, the rotor discs 24-1 and 24-2 and the molded windings 16A-1, 16A-2 and 16B are arranged alternately in the axial direction. It is therefore difficult to place the rotor 12 within the casing 11.

In the axial-gap rotary-electric machine according to this invention, the stator 11 is divided into halves and can therefore contain the stator 11 since the stator 11 is divided, too, into halves at a plane containing the axis of the rotor 12 and these halves are coupled together.

The disc-shaped molded windings 16A-1, 16A-2, and 16B are comprised of two halves each. These windings therefore form real poles and virtual poles arranged alternately since they are made by either one-direction winding method or concentric winding method. The centers of the virtual poles are lies in the line dividing the stator 11 into halves. To be more specific, when two adjacent windings form an N pole each, a virtual S pole is formed between these windings. Hence, the center of this virtual pole is placed in said line, thereby dividing the stator 11 into halves. The conductors of the molded windings 16A-1, 16A-2, and 16B will therefore be not cut.

The rotary-electric machine of this invention is of axial-gap type and can be divided into halves at a plane containing the axis of the rotor 12. The rotor 12 can therefore be easily removed out of the stator 11, which facilitates the maintenance of the machine. In addition, since each winding 17 is an independent molded unit, not made by winding a wire around the teeth of a core as the conventional windings, only the molded windings 16A-1, 16-2, and 16-B can easily be removed, merely by separating the halves of the stator 12 from each other. This makes it easy to replace the windings 17 with new ones.

As has been indicated, a number of cylindrical permanent magnets 25 are arranged, deviated from a radial direction by given angles as shown in FIG. 8. Skew effect can therefore be attained easily. The induced voltage can thereby have a cosine waveform, to thereby reduce the pulsation of the output.

The stator winding section described above comprises the windings 17 molded with epoxy resin. Instead, the stator winding section may be formed by applying semiconductor technology—that is, by mounting semicircular windings one upon another, each comprising a thin insulating substrate and a conductor printed on the substrate.

Figure 9:
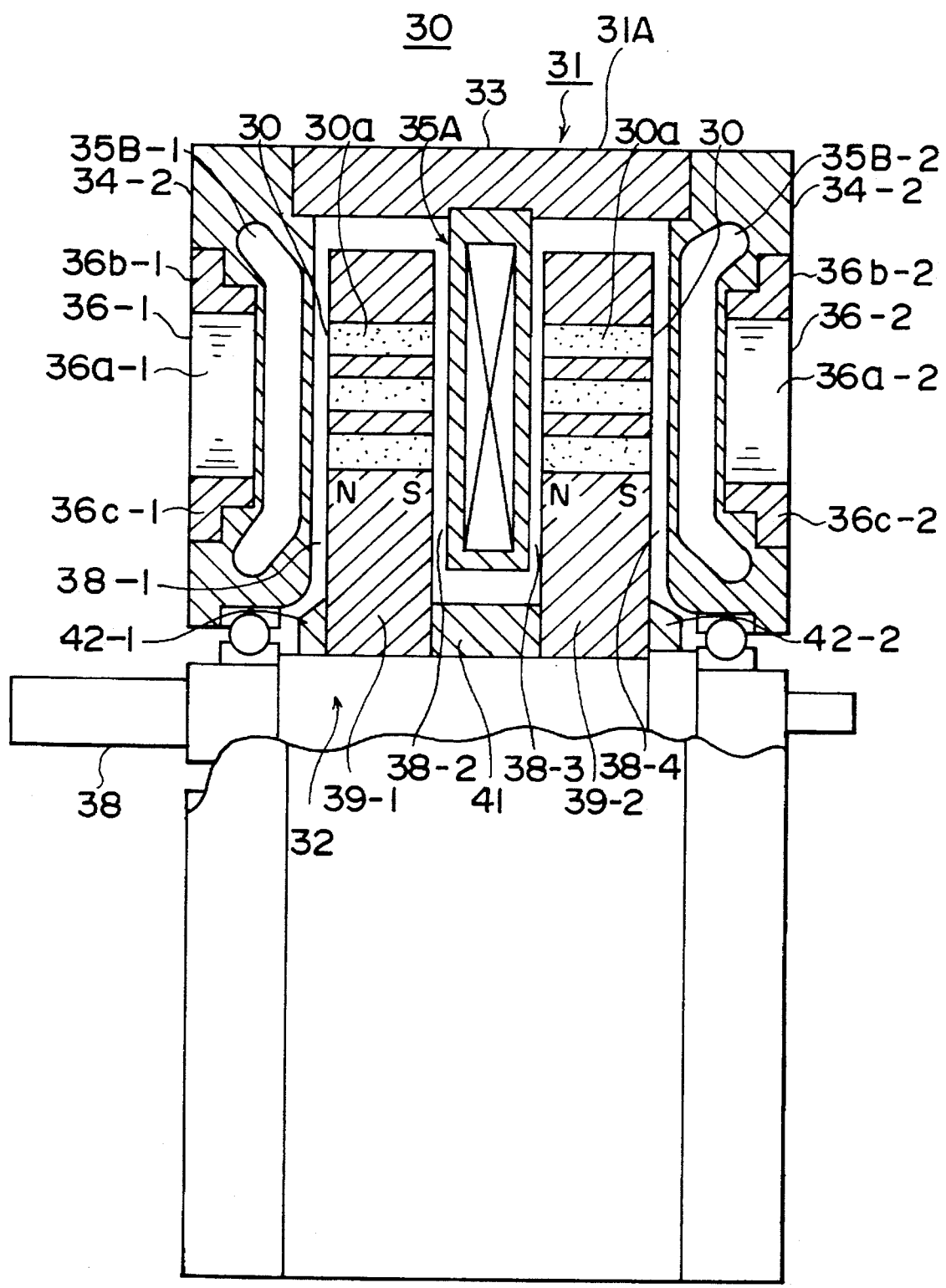
FIG. 9 is a sectional view showing the upper half of an embodiment of the present invention.

FIG. 9 is a sectional view showing the upper half of another embodiment of the present invention. As shown in FIG. 9, the axial-gap rotary-electric machine according to this embodiment comprises a stator 31 and a rotor 32 supported in the stator 31 by means of a bearing.

The stator 31 includes a casing 31A and a molded coil 25B. The casing 31A is comprised of a frame 33, brackets 34-1 and 34-2, molded coils 35A-1 and 35A-2, and back yokes 36-1 and 36-2.

The frame 33 is a molding made of fiber-reinforced epoxy resin, divided into halves at a plane containing the axis of the rotor 32. The brackets 34-1 and 34-2 are attached by bolts (not shown) to the ends of the frame 33 which are spaced in the axial direction. They are moldings made of fiber-reinforced epoxy resin. The molded coils 35B-1 and 35B-2 are embedded in the brackets 36-1 and 36-2 and opposes the molded coils 35A-1 and 35A-2, with rotor discs (later described) interposed among the coil 35B and the coils 35A-1 and 35-2. The back yokes 36-1 and 36-2 are embedded in or attached by bolts to the brackets 34-1 and 34-2, respectively, such that they are located outside the molded coils 35B-1, 35B-2.

Figure 10:
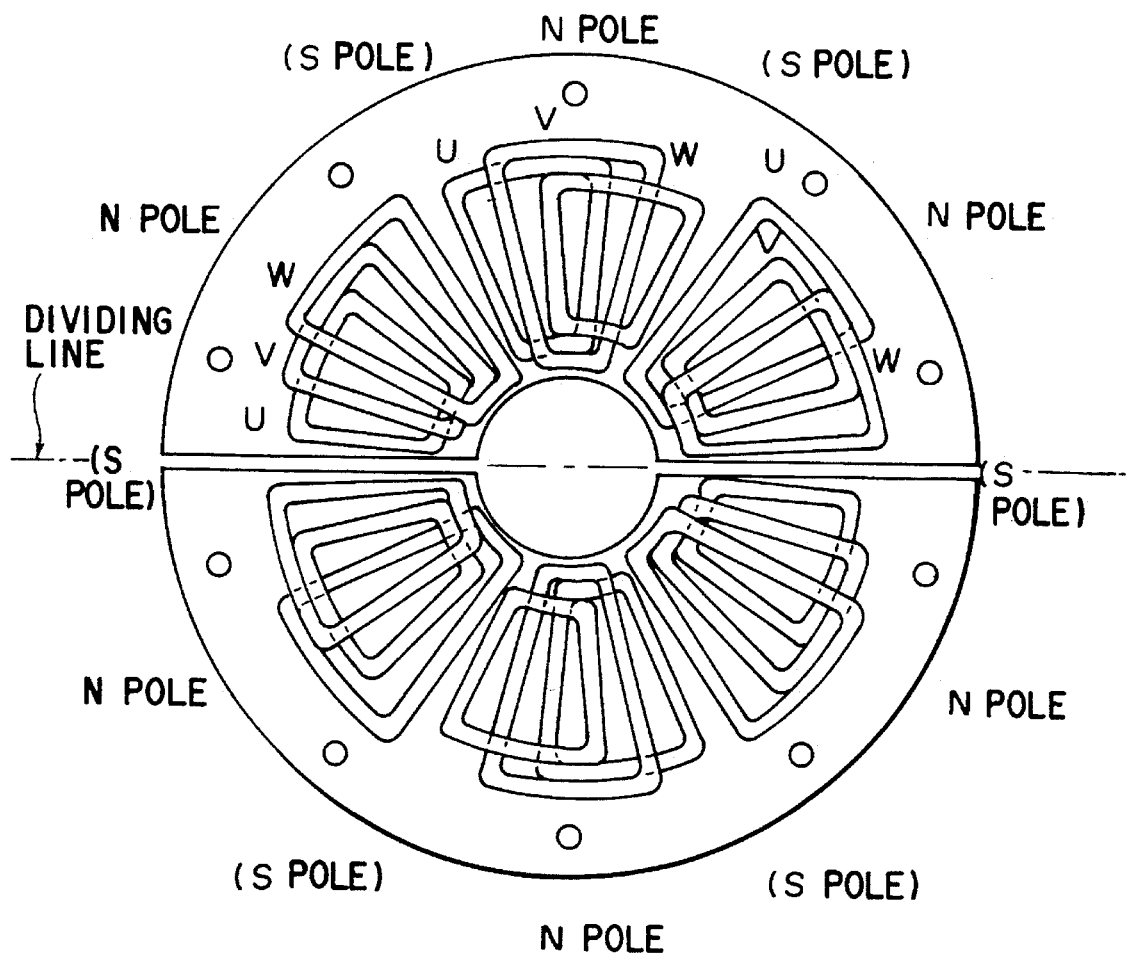
FIG. 10 is a diagram showing the molded coil incorporated in the embodiment of this invention.

The molded coils 35A-1 and 35A-2 are fastened to the frame 33 at a portion middle in the axial direction thereof, by means of bolts or any other proper fastening means (not shown). Each molded coil is substantially disc-shaped and divided into halves at a plane containing the axis of the rotor 32. As shown in FIG. 10, each of the molded coils 35A-1 and 35A-2 has phase windings U, V and W. The coils 35A-1 and 35A-2 have been formed either by one-direction winding method or by concentric winding method. Each is molded with epoxy resin or the like and consists of two halves.

Figure 11:
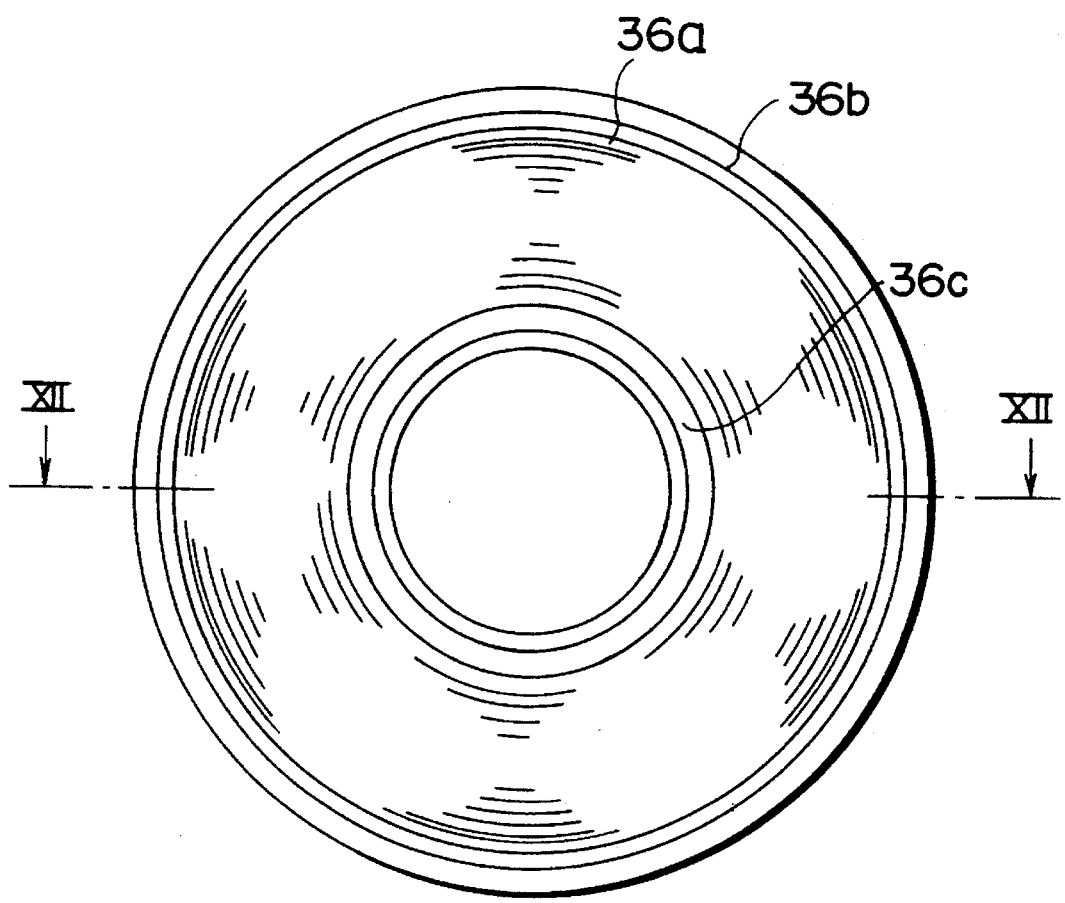
FIG. 11 is a front view of one of the back yokes used in the embodiment of the present invention.
Figure 12:
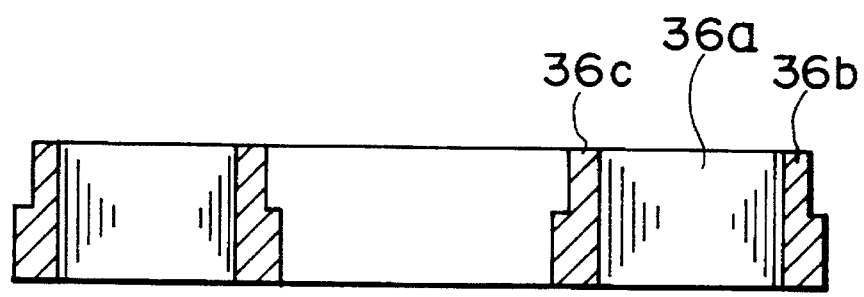
FIG. 12 is a sectional view taken along line XI—XI in FIG. 11.

The molded coils 35B-1, 35B-2 also have similar phase windings U, V and W, but does not consists of two halves. Each of the back yokes 36-1 and 36-2 is formed of the strip 36a-1 or 36a-2 of silicon steel having a thickness of 0.2 mm, as shown in FIG. 9, and as shown in FIGS. 11 and 12 by reference numeral 36a, and is clamped and fixed between an outer ring 36b-1, 36b-2 (36b in FIGS. 11, 12) and an inner ring 36c-1, 36c-2, (36c in FIGS. 11, 12).

Figure 13:
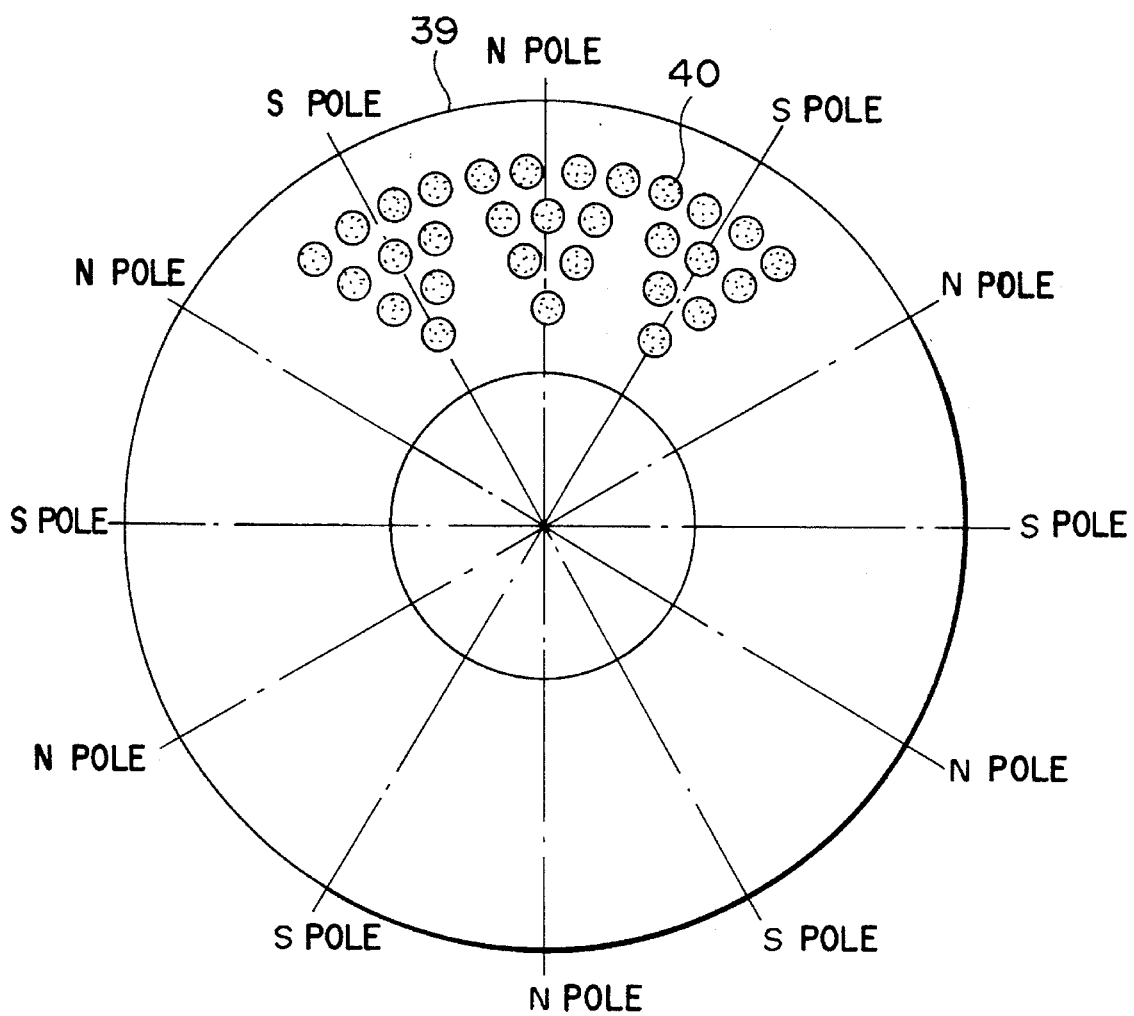
FIG. 13 is a diagram showing another type of a rotor disc for use in the embodiment of the invention.

The rotor 32 comprises a shaft 37 and two rotor discs 39-1 and 39-2. The two rotor discs are disc-shaped moldings made of fiber-reinforced resin and are connected to the shaft 37 so that they may rotate together with the shaft 37. As shown in FIGS. 9 and 13, twelve groups 30 of permanent magnets 30a are attached to each of the rotor discs 39-1 and 39-2 at twelve places spaced at regular intervals, ten permanent magnets at each place. Each group 40 of permanent magnets forms one magnetic pole. Thus, a plurality of magnetic poles are formed on each of the rotor discs 39-1 and 39-2. The permanent magnets 40a are solid cylinders, magnetized in the axial direction of the machine, and embedded and fixed in through holes made in each of the rotor discs 39-1 and 39-2. A metal ring (not shown) is formed integral with the center portion of each of the rotor discs 39-1 and 39-2. The metal ring is set in engagement with a key (not shown) and can thereby rotate together with the shaft 37. Furthermore, a spacer 41 is interposed between the rotor discs 39-1 and 39-2. Ring-shaped fasteners 42-1, 42-2 push the rotor discs 39-1 and 39-2 toward each other.

The operation of this embodiment constructed as described above will now be described. First, its mechanical features will be explained.

Figure 2:
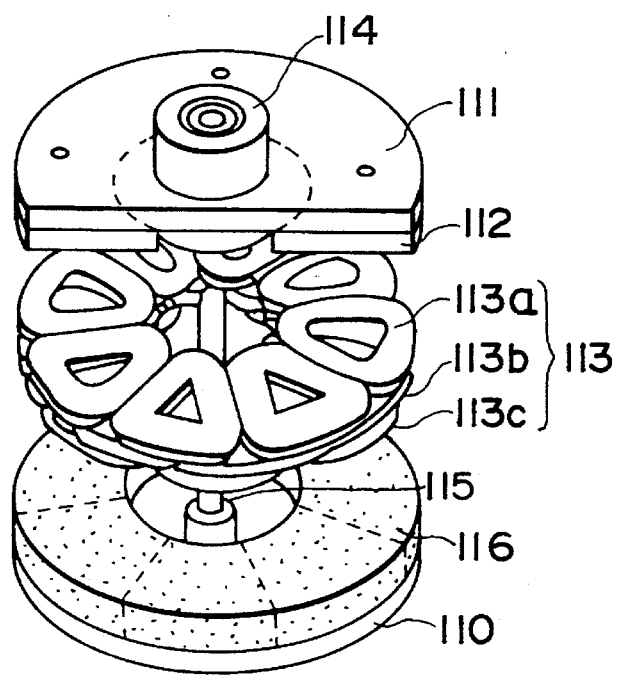
FIG. 2 is a diagram schematically showing a conventional axial-gap rotary-electric machine.

The lightness and acceleration-deceleration characteristic of the embodiment will be described. As is known well, a rotary-electric machine needs to have a yoke made of magnetic material, which is used as a magnetic path for applying magnetic fluxes to the rotor. If the machine has a large capacity, the inertia is relatively great. The conventional axial-gap rotary-electric machine shown in FIG. 2 has a considerably large inertia if the yoke is made of magnetic material such as soft iron, since the yoke is shaped like a disc. Hence, the machine cannot be fast accelerated or decelerated.

In the present embodiment, the rotor can be made of nonmagnetic material, except for the shaft and the permanent magnets 30a. Further, the rotor discs 39-1 and 39-2 of the rotor are moldings made of fiber-reinforced resin having a specific gravity of 1.5. Therefore, the inertia of the rotor is very small.

The weight characteristic of this embodiment will be explained. The rotor discs 39-1 and 39-2, the frame 33, and the brackets 34-1 and 34-2 are made of resin. The components made of metal are only the back yokes 36-1 and 36-2, the windings of the molded coils 35A-1, 35A-2 and 35B-1, 35B-2, the permanent magnets 30a, and the shaft 37. Thus, the machine is very light. As will be described later, the rotary-electric machine of this embodiment can have a multi-stage operating section so that it may have a great capacity. To construct a multi-stage operating section, it suffices to use the molded coils 35A-1 and 35A-2 and the permanent magnets 30a in greater numbers, while maintaining the back yokes 36-1 and 36-2 and the brackets 34-1 and 34-2 in size and weight. In this case, the effect of lightening is remarkable.

The high-speed rotation characteristic of this embodiment will be described. To increase the mechanical strength of a rotary-electric machine against the centrifugal force the machine generates while rotating, it is required that the peripheral portion of the rotor have a sufficient thickness. In the conventional rotary-electric machine shown in FIG. 1, which has a hollow cylindrical, radial magnetic circuit having field-system coils arranged in the radial direction, the gap 109 will be long if the ring 102 holding the rotor is made thick.

In the present embodiment, the groups 30a of permanent magnets 30a constituting the field system are embedded in the surfaces of the rotor discs 39-1 and 39-2 and extend parallel to the axis. The rotor discs 39-1 and 39-2 therefore prevent the groups 30a of permanent magnets 30a from moving under the centrifugal force generated when the machine 10 rotates at high speed. Furthermore, the magnetic gap in the magnetic circuit does not increase even if the peripheral portions of the rotor discs 39-1 and 39-2 are made sufficiently thick. This is because the magnetic field generated by the groups 40 of permanent magnets (i.e., the permanent magnets 40a) extends in the axial direction of the shaft. Hence, the output of the machine will not be decreased by increasing the mechanical strength against the centrifugal force, whereby the machine can rotate at high speed. The groups 30 permanent magnets 30a form the poles of a magnetic field, and not just one permanent magnet 30a is used for forming one pole. Rather, a plurality of permanent magnets 30a (e.g., ten magnets) are distributed to form one pole. The permanent magnets 40a of each group 40 are embedded in a plurality of holes (e.g., ten holes) made in the surface of each of the rotor discs 39-1 and 39-2. Therefore, the stress resulting from the centrifugal force does not concentrate at a part of either rotor disc. The rotor discs 39-1 and 39-2 can remain integral while rotating at a very high speed.

It will be explained how this embodiment has a large capacity. To increase the capacity of the conventional axial-gap rotary-electric machine, the rotor needs to have a larger diameter, inevitably making the machine more massive and increasing the inertia of the rotor. Consequently, the allowable maximum rotational speed of the rotor will greatly decrease due to the mechanical strength against centrifugal force. As will be described later in conjunction with the electromagnetic aspect, the present embodiment has no rotor core, and its magnetic circuit consists of only two back yokes 36-1 and 36-2 located inside the brackets 34-1 and 34-2, the groups 40a of permanent magnets 40, and gaps 38-1, 38-2, 39-3 and 38-4. The magnetic components constituting a magnetic path are the two back yokes 36-1 and 36-2 only. Hence, it suffices to arrange the molded coils 35A-1 and 35A-2 and the rotor discs 39-1 and 39-2, each of which can be divided into halves, alternately between the two back yokes 15-1, 15-2, thereby constituting a multi-stage operating section in the rotary-electric machine. The output of the machine can therefore increase.

The rotor 32 may be of multi-stage structure to increase the capacity of the machine. Nonetheless, the inertia of the rotor 32 is much smaller than in the conventional machine since the rotor discs 39-1 and 39-2 attached to the rotor 32 are made of resin. In addition, the mechanical stress on the rotor discs of the multi-stage rotor 32 is not large since the rotor discs 39-1 and 39-2 have the same outer diameter. Thus, the axial-gap rotary-electric machine can have a great capacity in the mechanical aspect as well.

Since the rotary-electric machine of this embodiment is an axial-gap type, its rotor 32 is shaped like a top or a flywheel. The distance between the bearings supporting the rotor discs 39-1 and 39-2, respectively, is therefore very short, increasing the rigidity of the rotating system. As a result, the shaft system has a high natural frequency. The shaft vibrates but a little and is stable even while rotating at a very high speed.

FIG. 14 is a diagram showing the results of an analysis of the vibration of the shaft of the present embodiment. As can be understood from FIG. 14, the shaft assumes the first-order vibration mode at 33000 rpm. This means that the shaft has good high-speed rotation characteristic.

FIG. 15 is a diagram illustrating the results of a test conducted on the present embodiment in respect of the mechanical strength against centrifugal force. As evident from FIG. 15, the shaft displaced but a little while it was rotating at 20000 rpm. It was confirmed that the rotor rotated stably and exhibited a sufficient mechanical strength.

The electromagnetic characteristic of the present embodiment will now be described. Each of the molded coils 35A-1, 35A-2, and 35B is comprised of phase windings U, V and W and a layer of fiber-reinforced epoxy resin only. Furthermore, the rotor has no iron core. Thus, the magnetic circuit is formed of only the back yokes 36-1 and 36-2 located inside the brackets 34-1 and 34-2, the groups 30 of permanent magnets 30a, and gaps 38-1, 38-2, 38-3 and 38-4. The magnetic components forming a magnetic path are the two back yokes 36-1 and 36-2 only. Hence, it suffices to arrange the molded coils 35A-1 and 35A-2 and the rotor discs 39-1 and 39-2 alternately between the two back yokes, thereby constituting a multi-stage operating section in the rotary-electric machine. The output of the machine can therefore increase.

Since the stator core has no teeth, the magnetic circuit consists of only the back yokes 36-1 and 36-2, the groups 30 of permanent magnets 30a, and the gaps 38-1, 38-2, 38-3 and 38-4. Hence, only the magnetic components forming the magnetic path, i.e., the two back yokes 36-1 and 36-2, can form the multi-stage operating section of the rotary-electric machine. The iron loss therefore decreases greatly, enhancing the efficiency of the rotary-electric machine and reducing the temperature increase occurring during the operation of the machine. If the stator core had teeth, the teeth would cause pulsation of the magnetic fluxes in the gap, while rotating at high speed, inevitably generating a considerably large eddy current at the rotor surface. Since the stator core has no teeth, no eddy current is generated in the rotary-electric machine of this embodiment. The machine therefore has high efficiency.

It is natural that the inner circumference of the machine should be short as in any axial-gap rotary-electric machine. The space available for the ends of the molded coils 35A-1 and 35A-2 is limited. This renders it impossible for each winding to have many turns. Despite this, the machine of the present embodiment can have many poles and rotate at a very high speed since, as described above, the iron loss is reduced. Furthermore, when the machine of this embodiment is made to be a multi-pole type, the ends of the molded coils 35A-1 and 35A-2 can be shorter so that each may have more turns to increase the output of the machine.

The back yokes 36-1 and 36-2 are coils, each formed of the strip 36a (FIGS. 11, 12) of silicon steel having a thickness of 0.2 mm and clamped and fixed between the outer ring 36b (FIGS. 11, 12) and the inner ring 36c (FIGS. 11, 12). With the back yokes so constructed, the generation of a eddy current is controlled, thereby minimizing an increase in the iron loss.

The soft magnetic material forming a magnetic path for the molded coils 35A-1, 35A-2, and 35B-1, 35B-2 is only that of the back yokes 36-1 and 36-2. The magnetic gaps to the molded coils 35A-1, 35A-2, and 35B-1, 35B-2 are considerably wide. Hence, the inductance of each molded coil is low, and the voltage drop due to the inductance is small. The voltage across the terminals of each molded coil is low. The power supply for driving the molded coils can be a small one.

Since the magnetic gaps are wide, the armature reaction due to the molded coils 35A-1, 35A-2, and 35B-1, 35B-2 is small. Hence, the permanent magnets 30a are prevented from being demagnetized, making it possible to flow a large current.

In the embodiment described above, two rotor discs 39-1 and 39-2 are attached to the rotor 32. Needless to say, it is possible to attach only one rotor disc, 39-1 or 39-2, to the rotor 32. If this is the case, the molded coils 35A-1 and 35A-2 are not used, and it is unnecessary to divide the stator frame 33 into halves.

Figure 4:
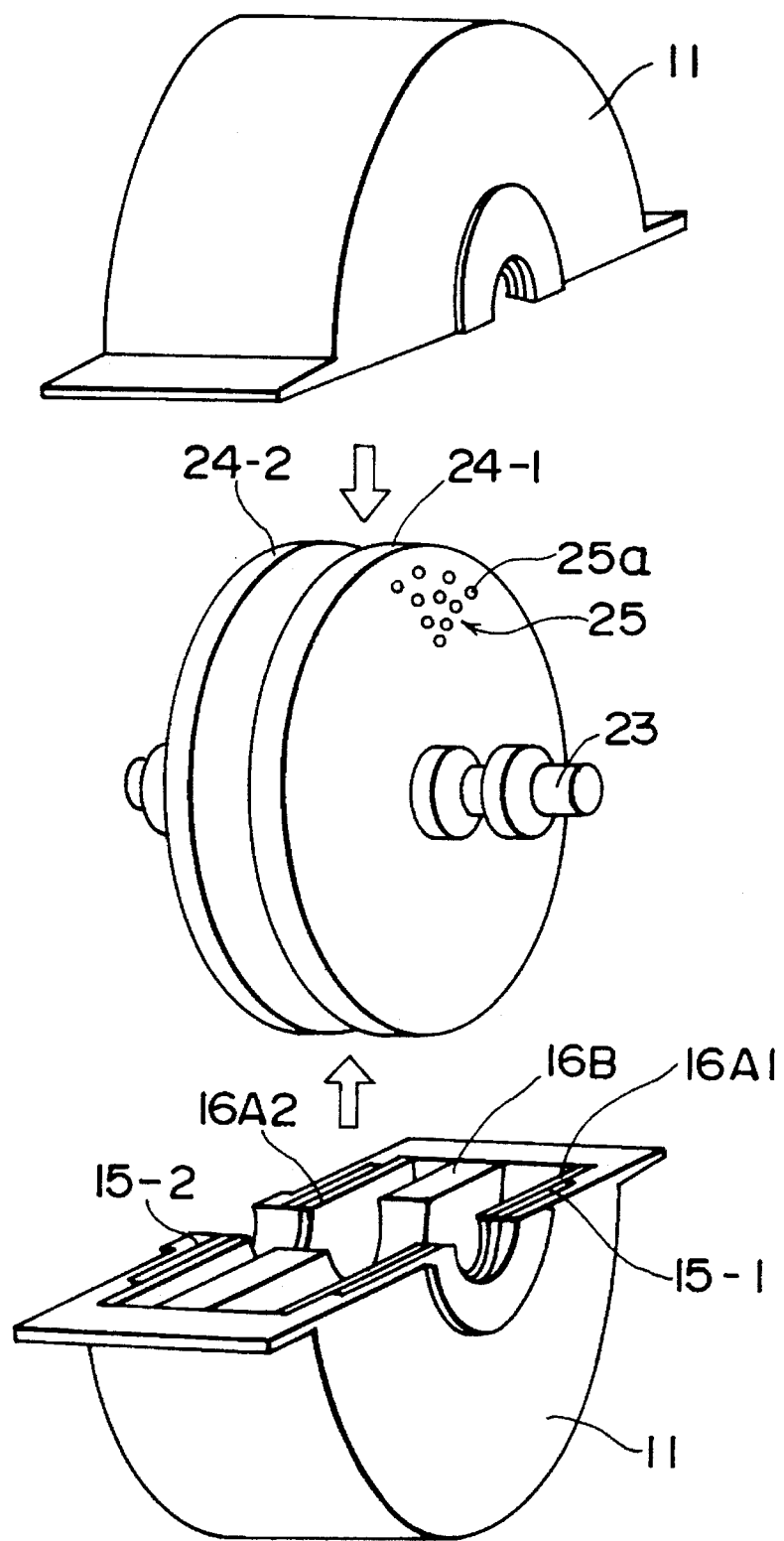
FIG. 4 is a diagram schematically showing the stator incorporated in the embodiment of the present invention.

Another embodiment of the invention will now be descried, in which the stator is divided into halves as in the embodiment of FIG. 4, and the molded coils and the back yokes are formed not integral with the brackets and fastened to the brackets by bolts.

Figure 16:
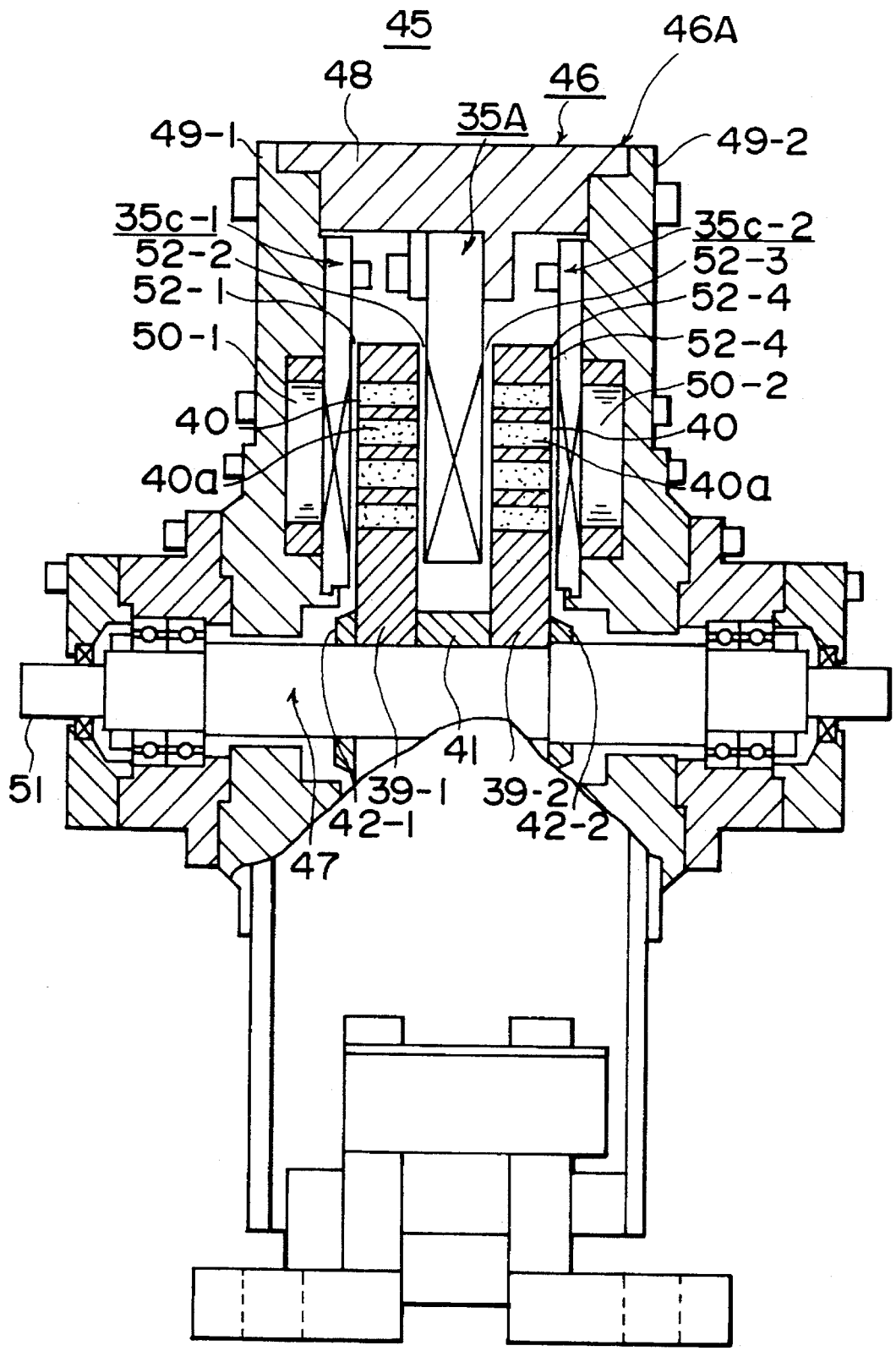
FIG. 16 is a sectional view illustrating the upper half of another embodiment of the present invention.

FIG. 16 is a sectional view illustrating the upper half of this embodiment. As shown in FIG. 16, the axial-gap rotary-electric machine 45 comprises a stator 46 and a rotor 47 rotatably supported in the stator 46 by means of a bearing.

The stator 46 includes a casing 46A and a molded coils 35C-1 and 35c-2. The molded coils 35C-1 and 35C-2 are fastened by bolts to brackets 49-1 and 49-2 and oppose each other, with rotor discs (later described) located between them.

The casing 46A is comprised of a stator frame 48, brackets 49-1 and 49-2, molded coils 35A-1 and 35A-2, and back yokes 50-1 and 50-2.

Figure 17:
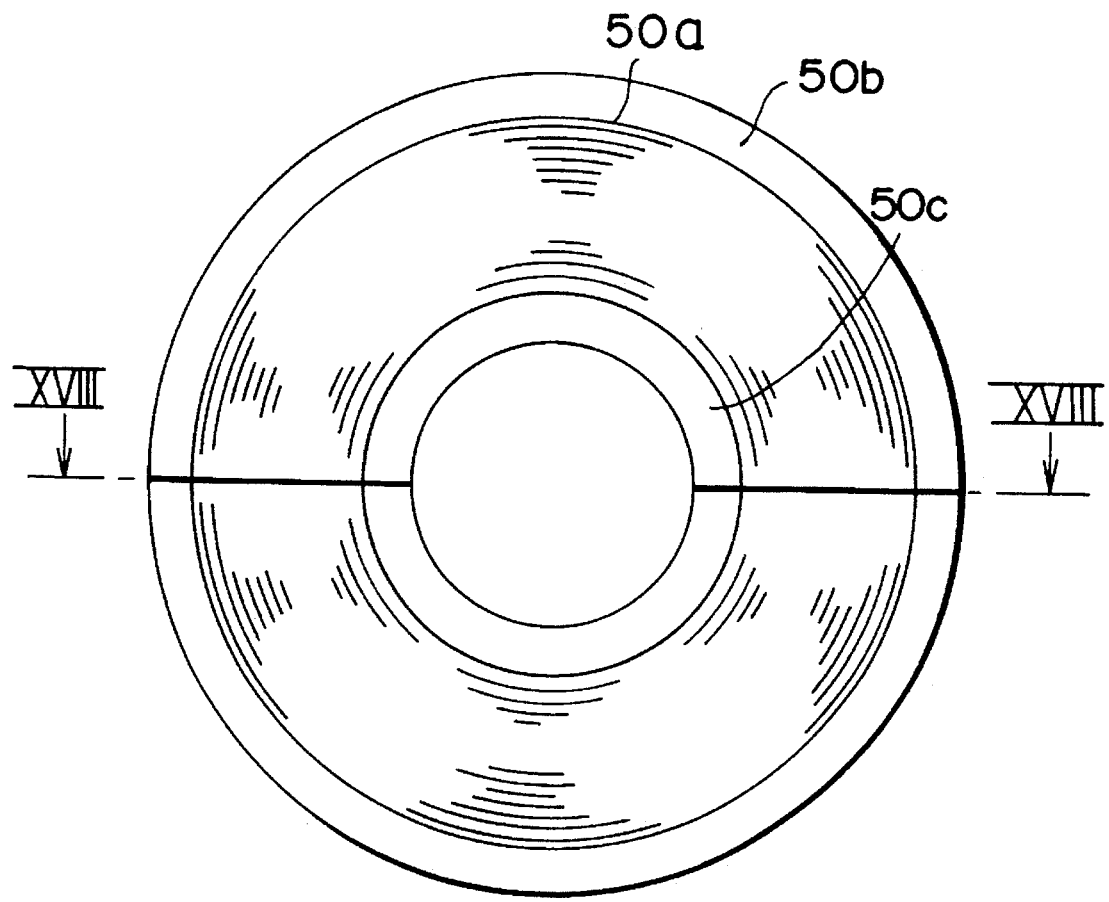
FIG. 17 is a front view of one of the back yokes used in the other embodiment of this invention.
Figure 18:
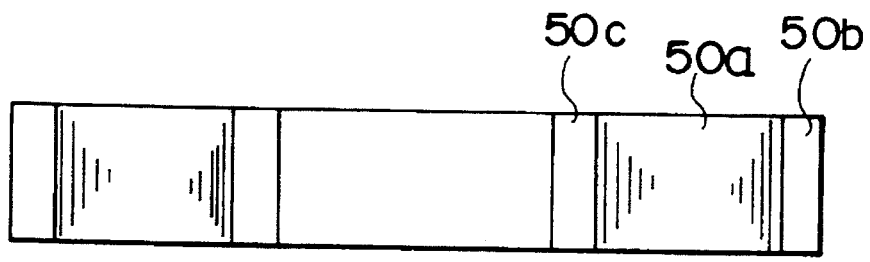
FIG. 18 is a sectional view taken along line XVIII—XVIII in FIG. 17.

The stator frame 48 is a molding made of fiber-reinforced epoxy resin, divided into halves at a plane containing the axis of the rotor 47. The brackets 49-1 and 49-2 are attached by bolts to the ends of the stator frame 48 which are spaced in the axial direction. They are moldings made of fiber-reinforced epoxy resin. Each bracket is divided into halves at a plane containing the axis of the rotor 47. As shown in FIG. 10, the molded coils 35A-1 and 35A-2 are fastened to the stator frame 48 at a portion middle in the axial direction thereof, by means of bolts, along with the brackets 49-1 and 49-1. Each molded coil is divided into an upper half and a lower half. The back yokes 50-1 and 50-2 are embedded in the recesses made in the brackets 49-1 and 49-2 and attached by bolts to the brackets 49-1 and 49-2, respectively, such that they are located outside the molded coils 35C-1 and 35C-2. As shown in FIGS. 17 and 18, the back yokes 50-1 and 50-2 are coils, each formed of the strip 50a of silicon steel having a thickness of 0.2 mm and clamped and fixed between an outer ring 50b and an inner ring 50c.

The rotor 47 comprises a shaft 51 and two rotor discs 39-1 and 39-2. The two rotor discs are connected to the middle portion of the shaft 51 so that they may rotate together with the shaft 51. The rotor discs are positioned such that they define gaps 52-1, 52-2, 52-3, and 52-4, jointly with the molded coils 35A-1, 35A-2, 35C-1, and 35C-2. Rod-shaped permanent magnets 40a are attached to each of the rotor discs 39-1 and 39-2. They are magnetized in the axial direction of the machine, and embedded and fixed in through holes made in each of the rotor discs 39-1 and 39-2. A metal ring (not shown) is formed integral with the center portion of each of the rotor discs 39-1 and 39-2. The metal ring is set in engagement with a key (not shown) and can thereby rotate together with the shaft 51. Furthermore, a spacer 41 is interposed between the rotor discs 39-1 and 39-2. Ring-shaped fasteners 42 push the rotor discs 39-1 and 39-2 toward each other.

Another embodiment of the invention will be described, which comprises a stator divided into halves, four molded coils attached to the stator, a rotor, three rotor discs attached to the rotor, brackets, molded coils connected to the brackets but not formed integral therewith, and back yokes connected to the brackets but not integral therewith.

Figure 19:
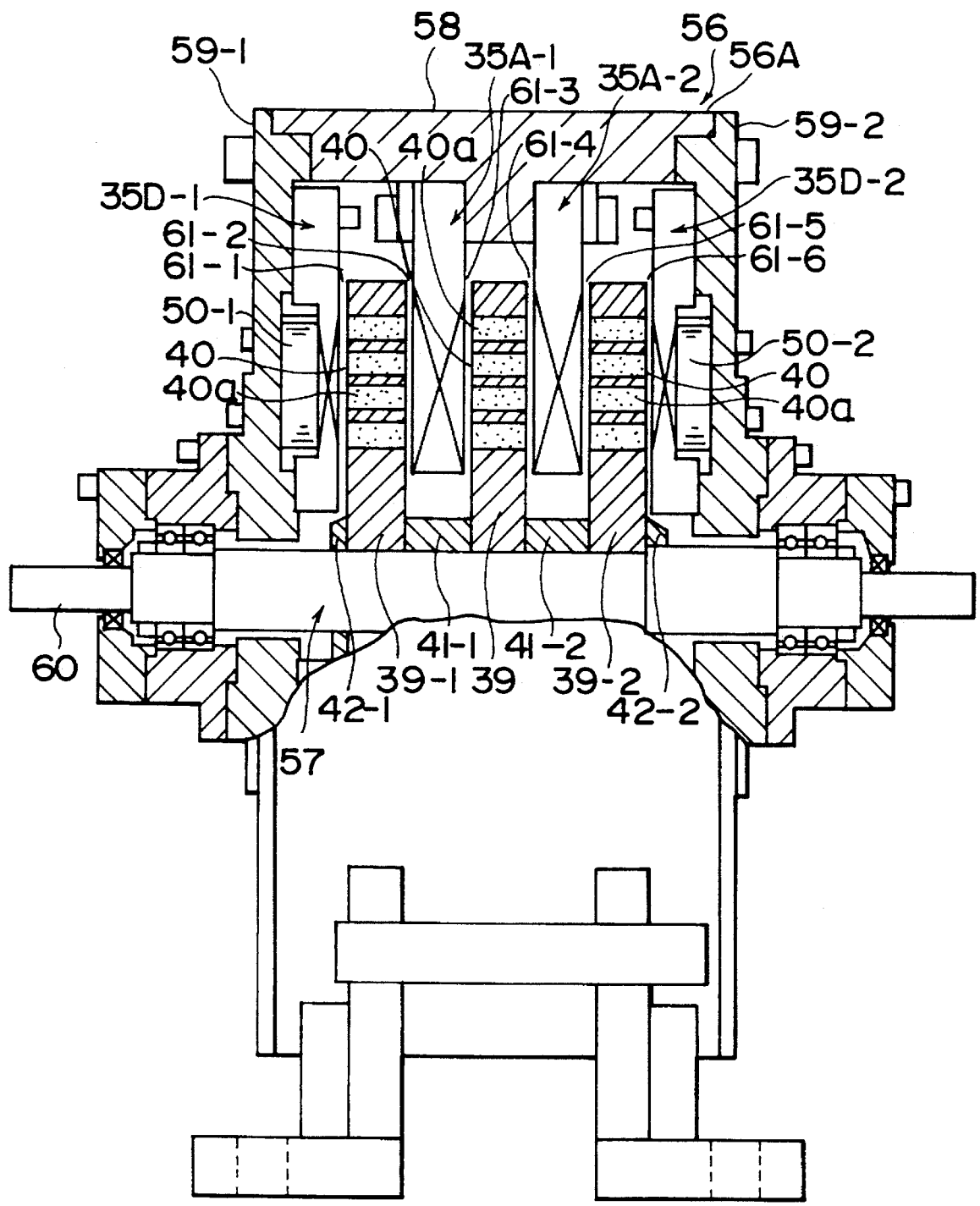
FIG. 19 is a sectional view illustrating the upper half of still another embodiment of the invention.
Figure 20:
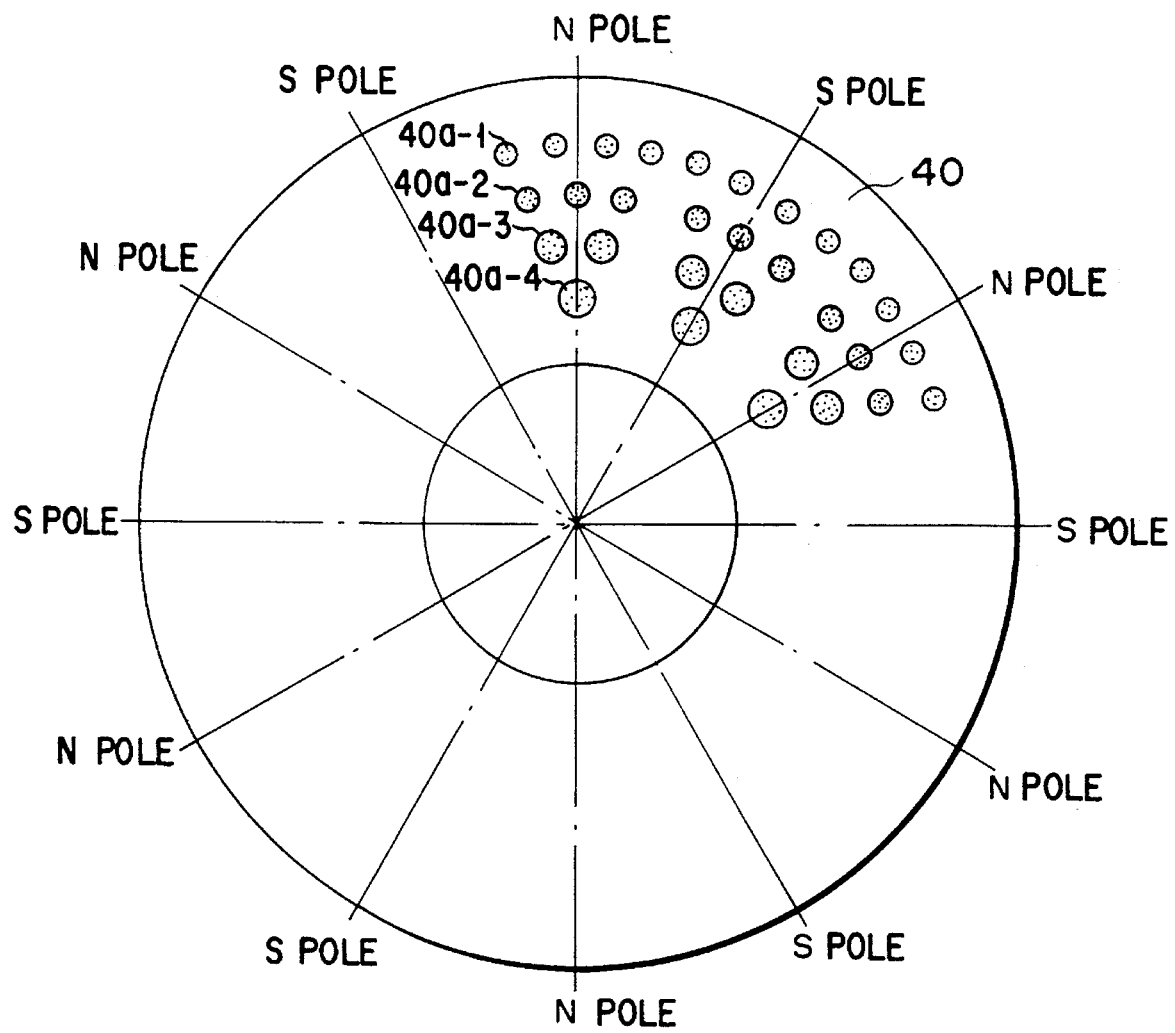
FIG. 20 is a diagram showing a rotor disc different from the disc shown in FIG. 13, designed for use in each of the embodiments of the present invention.

FIG. 19 is a sectional view showing the upper half of this embodiment. As shown in FIG. 19, this axial-gap rotary-electric machine 55 comprises a stator 56 and a rotor 57 rotatably supported in the stator 56 by means of a bearing.

The stator 56 includes a casing 56A and a molded coils 35D-1, 35D-2 and 35D-3. The molded coils 35D-1, 35D-2, and 35D-3 are fastened by bolts to brackets 59-1 and 59-2 and oppose each other, with rotor discs (later described) located between them.

The casing 56A is comprised of a stator frame brackets 59-1 and 59-2, molded coils 35A-1 and 35A-2, and back yokes 50-1 and 50-2. The stator frame 58 is a molding made of fiber-reinforced epoxy resin, divided into halves at a plane containing the axis of the rotor 57. The brackets 59-1 and 59-2 are attached by bolts to the ends of the stator frame 58 which are spaced in the axial direction. The brackets 56-1 and 59-2 are moldings made of fiber-reinforced epoxy resin. Each bracket is divided into halves at a plane containing the axis of the rotor 57. As shown in FIG. 10, the molded coils 35A-1 and 35A-2 are fastened to the stator frame 58 at a portion middle in the axial direction thereof, by means of bolts, and oppose each other with rotor discs (later described) located between them. Each molded coil is divided into an upper half and a lower half. The back yokes 50-1 and 50-2 are embedded in the recesses made in the brackets 59-1 and 59-2 and attached by bolts to the brackets 49-1 and 49-2, respectively.

The rotor 57 comprises a shaft 60 and three rotor discs 39-1, 39-2 and 39-3. These rotor discs are connected to the middle portion of the shaft 60 so that they may rotate together with the shaft 60. The rotor discs are positioned such that they define gaps 61-1, 61-2, 61-3, and 61-4, jointly with the molded coils 35A-1, 35A-2, 35C-1, and 35C-2. Rod-shaped permanent magnets 40a are attached to each of the rotor discs 39-1, 39-2 and 39-3. They are magnetized in the axial direction of the machine, and embedded and fixed in through holes made in each of the rotor discs 39-1, 39-2 and 39-3. A metal ring (not shown) is formed integral with the center portion of each of the rotor discs 39-1, 39-2 and 39-3. The metal ring is set in engagement with a key (not shown) and can thereby rotate together with the shaft 60. A plurality of permanent magnets 40a form one group 40. A plurality of groups 40 of permanent magnets form a plurality of magnetic poles on each of the rotor discs 39-1, 39-2 and 39-3.

Furthermore, spacers 41 are interposed among the rotor discs 39-1, 39-2 and 39-3. Ring-shaped fasteners 42 push the rotor discs 39-1 and 39-2 toward each other.

In order to remain integral while rotating at high speed, the machine may have permanent magnets 40a-1, 40a-2, 40a-3 and 40a-4 which differ in diameter in accordance with their positions with respect to the inner and outer peripheries of the rotor discs 39-1, 39-2, and 39-3 as is illustrated in FIG. 10. More specifically, the magnets 40a-1 located near the outer periphery of the rotor disc have a smallest diameter, whereas the magnets 40a-4 located near the inner periphery of the rotor disc have a largest diameter. Instead of using permanent magnets different in diameter, permanent magnets different in energy product may be utilized, positioning the magnets having a large energy product near the inner periphery of the rotor disc and those having a smaller energy product near the outer periphery of the rotor disc. In either alternative fashion, permanent magnets generating magnetic fields of different strengths can be utilized in the present invention. Moreover, the rotor discs may be made of nonmagnetic metal having a small specific gravity, such as duralumin, instead of fiber-reinforced resin. Furthermore, the molded coils may not be formed by using resin; they may instead be formed by applying semiconductor technology— that is, by mounting semicircular windings one upon another, each comprising a thin insulating substrate and a conductor printed on the substrate. Still further, not only the back yokes are connected to the stator, but also the stator core may have teeth. In this case, too, the advantages of the invention, i.e., a great capacity and high-speed rotation, can be attained, though the iron loss increases, the armature reaction is somewhat noticeable, and the load on the bearings increases due to an increase in the magnetic attraction working in the thrust direction.

As has been described, in the present invention, since the rotor discs, which are the major components of the rotor, are made of resin, the inertia of the rotor is very small. The rotary-electric machine according to the invention can therefore rotate at a very high speed, can fast accelerate and decelerate, and can be made small. Further, since the stator frame, the brackets, and the like of the machine are made of resin, only a few components of the machine are made of metal, whereby the machine is very light. The output of the rotary-electric machine can be used effectively when the machine is employed as a servo motor in a robot wherein the machine itself is a part of the load, or is used as drive motor in an electric automobile. Furthermore, since the stator is divided into halves, the stator coils and the rotor discs are alternately arranged, forming gaps among them, thereby constituting a multistage operating section. This imparts a large output to the machine and serves to facilitate the maintenance of the machine.

The axial-gap rotary-electric machine according to the present invention can be provided in the form of either a single-phase machine or a polyphase machine. A device for driving the machine can be an existing system or a system which will be available in the future. The drive device should be a system to which appropriate electronics technology.

The present invention is not limited to the embodiments described above. Various changes and modifications can be made, without departing from the scope defined by the following claims and illustrated in the accompanying drawings, or possible combinations of the claims and the drawings.

I claim:

1. An axial-gap rotary-electric machine comprising:

a stator member;

a shaft rotatably arranged on said stator member;

at least one disc member made of nonmagnetic material, rotatable together with said shaft, spaced from said stator member in an axial direction of said stator member, thereby forming a gap; and a plurality of groups of permanent magnet members, each group located inside said disc member to form a plurality of magnetic poles along a circumference of said disc member and to form a magnetic path passing and extending through said disc member in the axial direction of said stator member, said permanent magnet members of each group distributed in the disc member to form one pole and deviated from a radial direction by predetermined angles, wherein at least one group of the permanent magnet members comprises permanent magnets having different magnetic field intensities, including at least one permanent magnet having a small magnetic field intensity embedded in an outer peripheral portion of the disc member, and at least one permanent magnet having a large magnetic field intensity embedded in an inner peripheral portion of the disc member.

2. An axial-gap rotary-electric machine comprising:

a casing member having a back-yoke member;

a shaft rotatably arranged on said casing member;

at least one first stator winding divided into a plurality of units in a radial direction of said shaft;

a disc member made of nonmagnetic material, rotatable together with said shaft, spaced from said casing member in an axial direction of said shaft, thereby forming a gap; and a plurality of groups of permanent magnet members, each group located inside said disc member to form a plurality of magnetic poles along a circumference of said disc member and to form a magnetic path passing and extending through said disc member in the axial direction of said back yoke member, said permanent magnet members of each group embedded and distributed in the disc member to form one pole and deviated from a radial direction by predetermined angles, wherein at least one group of the permanent magnet members comprises permanent magnets having different magnetic field intensities, including at least one permanent magnet having a small magnetic field intensity embedded in an outer peripheral portion of the disc member, and at least one permanent magnet having a large magnetic field intensity embedded in an inner peripheral portion of the disc member.

3. The axial-gap rotary-electric machine according to claim 1, wherein said disc member comprises a plurality of discs arranged in said axial direction.

4. The axial-gap rotary-electric machine according to claim 3, wherein said plurality of discs are arranged in said axial direction such that each disc has a magnetic pole center displaced from that of any other disc.

5. The axial-gap rotary-electric machine according to claim 1, wherein each of said groups of permanent magnet members comprises permanent magents having different magnetic field intensities.

6. The axial-gap rotary-electric machine according to claim 1, wherein said disc member is made of fiber-reinforced resin and secured to said shaft.

7. The axial-gap rotary-electric machine according to claim 1, wherein said disc member is made of nonmagnetic metal and formed integral with said shaft.

8. The axial-gap rotary-electric machine according to claim 2, wherein said disc member comprises a plurality of discs arranged in said axial direction.

9. The axial-gap rotary-electric machine according to claim 8, wherein said plurality of discs are arranged in said axial direction such that each disc has a magnetic pole center displaced from that of any other disc.

10. The axial-gap rotary-electric machine according to claim 2, wherein each of said groups of permanent magnet members comprises permanent magnets having different magnetic field intensities.

11. The axial-gap rotary-electric machine according to claim 8, wherein said disc member is made of fiber-reinforced resin and secured to said shaft.

12. The axial-gap rotary-electric machine according to claim 2, wherein said disc member is made of nonmagnetic metal and formed integral with said shaft.

13. The axial-gap rotary-electric machine according to claim 2, wherein said casing member comprises at least one second stator winding.

14. The axial-gap rotary-electric machine according to claim 13, wherein said second stator winding comprises a plurality of stator winding members divided in said radial direction of said shaft.

15. The axial-gap rotary-electric machine according to claim 2, wherein said casing member includes a frame member and a bracket member.

16. The axial-gap rotary-electric machine according to claim 15, wherein said bracket member comprises a plurality of plates divided in said radial direction.

17. The axial-gap rotary-electric machine according to claim 15, wherein said back yoke member comprises a plurality of yoke members divided in said radial direction.

18. The axial-gap rotary electric machine according to claim 15, wherein said back yoke member comprises a disc-shaped magnetic steel plate.

19. The axial-gap rotary-electric machine according to claim 15, wherein said back yoke member is made of a plurality of yoke members each formed of a magnetic steel plate wound in the form of a disc and divided in said radial direction.

20. The axial-gap rotary-electric machine according to claim 15, wherein said back yoke member is made of a plurality of yoke members each formed of a magnetic steel plate wound in the form of a disc and divided in said axial direction.

* * * * *